United States Patent
Purpura

(10) Patent No.: US 7,929,542 B2
(45) Date of Patent: Apr. 19, 2011

(54) SUPPORTING EFFECTIVENESS OF APPLICATIONS IN A NETWORK ENVIRONMENT

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 717 days.

(21) Appl. No.: 11/367,240

(22) Filed: Mar. 3, 2006

(65) Prior Publication Data
US 2007/0206506 A1 Sep. 6, 2007

(51) Int. Cl.
*H04L 12/28* (2006.01)
(52) U.S. Cl. .................. 370/395.21; 370/230; 370/401; 370/468; 709/227
(58) Field of Classification Search .................. 370/464, 370/465, 468, 431, 437, 462, 216–235, 351–356, 370/395.2, 395.21, 401; 709/225–229, 201–203; 455/450, 452.1, 452.2; 718/104
See application file for complete search history.

(56) References Cited

U.S. PATENT DOCUMENTS

| | | | |
|---|---|---|---|
| 6,640,248 B1 * | 10/2003 | Jorgensen | 709/226 |
| 6,754,230 B2 | 6/2004 | Purpura et al. | |
| 6,801,764 B2 | 10/2004 | Purpura | |
| 6,810,422 B1 * | 10/2004 | Cross | 709/227 |
| 6,977,898 B1 * | 12/2005 | Miriyala | 370/236 |
| 6,980,546 B2 | 12/2005 | Purpura et al. | |
| 7,069,014 B1 * | 6/2006 | Thenthiruperai et al. | 455/452.2 |
| 7,116,682 B1 * | 10/2006 | Waclawsky et al. | 370/468 |
| 7,289,453 B2 * | 10/2007 | Riedel et al. | 370/252 |
| 2002/0165963 A1 * | 11/2002 | Baxley et al. | 709/226 |
| 2003/0076785 A1 | 4/2003 | Purpura | |
| 2005/0094574 A1 * | 5/2005 | Han et al. | 370/254 |
| 2005/0100022 A1 * | 5/2005 | Ramprashad | 370/395.42 |
| 2010/0095017 A1 * | 4/2010 | Ghetie et al. | 709/232 |

\* cited by examiner

*Primary Examiner* — Aung S Moe
*Assistant Examiner* — Habte Mered
(74) *Attorney, Agent, or Firm* — Harness, Dickey & Pierce, P.L.C.

(57) ABSTRACT

A method of managing resources in a network. For each application executing on a host device, data transfer requirements are determined based on a capability level currently acceptable for the application. Methods of data transfer currently available to the host device for applying toward the data transfer requirements of the applications are determined. The method includes arbitrating allocation of network resources to a gateway and allocation of resources of the gateway to the host device based on probability of application effectiveness and network bandwidth management priorities, and arbitrating allocation of host device resources to the applications based on current acceptable capability level and probability of application effectiveness.

18 Claims, 7 Drawing Sheets

| APPLICATION CEA DEFINED OPERATIONAL REQUIREMENTS | OPERATING MODE | CEA RATING | REQUIRED INPUT DATA | | | REQUIRED OUTPUT DATA | | |
|---|---|---|---|---|---|---|---|---|
| | | | DELIVERY FORMAT | ACCESS PRIORITY | USE STATUS | DELIVERY FORMAT | ACCESS PRIORITY | USE STATUS |
| | A | 100% | STREAMING VIDEO & CONCURRENT LIVE DIGITAL (TEXT) DATA STREAM | 1 | IN USE | LIVE DIGITAL (TEXT) DATA STREAM | 1 | IN USE |
| | B | 85% | NON-REAL TIME GRAPHICS & CONCURRENT LIVE DIGITAL (TEXT) DATA STREAM | 1 | VERIFY | LIVE DIGITAL (TEXT) DATA STREAM | 2 | VERIFY |
| | C | 66% | LIVE DIGITAL (TEXT) DATA STREAM | 1 | VERIFY | LIVE DIGITAL (TEXT) DATA STREAM | 3 | VERIFY |
| APPLICATION CEA MODULE DECISION PARAMETERS | | | | | | ACCEPTABLE I/O FORMATS | ACCESS/CEA CODE | AVAILABILITY |
| | | | | | | STREAMING VIDEO & CONCURRENT LIVE DIGITAL (TEXT) DATA STREAM | 1:100 | LIVE |
| | | | | | | NON-REAL TIME GRAPHICS & CONCURRENT LIVE DIGITAL (TEXT) DATA STREAM | 1:85 | LIVE |
| | | | | | | LIVE DIGITAL (TEXT) DATA STREAM | 1:66 | LIVE |

| DEVICE COMMUNICATION OPERATIONAL REQUIREMENTS | METHOD | CEA | COMMUNICATION METHOD | ACCESS PRIORITY | USE STATUS | DELIVERY FORMAT SUPPORTED | AVAILABILITY | USE STATUS |
|---|---|---|---|---|---|---|---|---|
| | A | 100% | WIRELESS ETHERNET | 1 | | STREAMING VIDEO & CONCURRENT LIVE DIGITAL (TEXT) DATA STREAM | ON-LINE | IN USE |
| | | | | | 2 | NON-REAL TIME GRAPHICS & CONCURRENT LIVE DIGITAL (TEXT) DATA STREAM | | |
| | | | | | 3 | LIVE DIGITAL (TEXT) DATA STREAM | | |
| | B | 85% | HARDWIRED ETHERNET | 1 | | STREAMING VIDEO & CONCURRENT LIVE DIGITAL (TEXT) DATA STREAM | | |
| | | | | | 2 | NON-REAL TIME GRAPHICS & CONCURRENT LIVE DIGITAL (TEXT) DATA STREAM | | |
| | | | | | 3 | LIVE DIGITAL (TEXT) DATA STREAM | | |
| | C | 66% | CELLULAR DIGITAL MODEM | 1 | | LIVE DIGITAL (TEXT) DATA STREAM | AVAILABLE | HOT BACKUP |
| | D | 66% | LAND LINE DIGITAL MODEM | 1 | | LIVE DIGITAL (TEXT) DATA STREAM | | |
| DEVICE CEA MODULE DECISION PARAMETERS | | | ACCEPTABLE COMM MODES | | | | ACCESS/CEA CODE | AVAILABILITY |
| | | | WIRELESS ETHERNET | | | | 1:100 | LIVE |
| | | | HARDWIRED ETHERNET | | | | 1:85 | LIVE |
| | | | CELLULAR MODEM | | | | 1:66 | LIVE |
| | | | LAND LINE MODEM | | | | 1:66 | LIVE |

| APPLICATION CEA DEFINED OPERATIONAL REQUIREMENTS | OPERATING MODE | CEA RATING | REQUIRED INPUT DATA | | | REQUIRED OUTPUT DATA | | |
|---|---|---|---|---|---|---|---|---|
| | | | DELIVERY FORMAT | ACCESS PRIORITY | USE STATUS | DELIVERY FORMAT | ACCESS PRIORITY/CEA CODE | USE STATUS |
| | A | 100% | STREAMING VIDEO & CONCURRENT LIVE DIGITAL (TEXT) DATA STREAM | 1 | | LIVE DIGITAL (TEXT) DATA STREAM | 1 | |
| | B | 85% | NON-REAL TIME GRAPHICS & CONCURRENT LIVE DIGITAL (TEXT) DATA STREAM | 1 | | LIVE DIGITAL (TEXT) DATA STREAM | 2 | |
| | C | 66% | LIVE DIGITAL (TEXT) DATA STREAM | 1 | IN USE | LIVE DIGITAL (TEXT) DATA STREAM | 3 | IN USE |

APPLICATION CEA MODULE DECISION PARAMETERS

| | | ACCEPTABLE I/O FORMATS | | | ACCESS/CEA CODE | AVAILABILITY |
|---|---|---|---|---|---|---|
| | | STREAMING VIDEO & CONCURRENT LIVE DIGITAL (TEXT) DATA STREAM | | | 1:100 | |
| | | NON-REAL TIME GRAPHICS & CONCURRENT LIVE DIGITAL (TEXT) DATA STREAM | | | 1:85 | |
| | | LIVE DIGITAL (TEXT) DATA STREAM | | | 1:66 | LIVE |

DEVICE CEA MODULE DECISION PARAMETERS

| | | ACCEPTABLE COMM MODES | | | ACCESS/CEA CODE | AVAILABILITY |
|---|---|---|---|---|---|---|
| | | WIRELESS ETHERNET | | | 1:100 | LIVE |
| | | HARDWIRED ETHERNET | | | 1:85 | LIVE |
| | | CELLULAR MODEM | | | 1:66 | |
| | | LAND LINE MODEM | | | 1:66 | |

| DEVICE COMMUNICATION OPERATIONAL REQUIREMENTS | METHOD | CEA | COMMUNICATION METHOD | DELIVERY FORMAT SUPPORTED | ACCESS PRIORITY | USE PRIORITY | AVAILABILITY | USE STATUS |
|---|---|---|---|---|---|---|---|---|
| | A | 100% | WIRELESS ETHERNET | STREAMING VIDEO & CONCURRENT LIVE DIGITAL (TEXT) DATA STREAM | 1 | 1 | ON-LINE | IN USE |
| | | | | NON-REAL TIME GRAPHICS & CONCURRENT LIVE DIGITAL (TEXT) DATA STREAM | | 2 | | |
| | | | | LIVE DIGITAL (TEXT) DATA STREAM | | 3 | | |
| | B | 85% | HARDWIRED ETHERNET | STREAMING VIDEO & CONCURRENT LIVE DIGITAL (TEXT) DATA STREAM | 1 | 1 | | |
| | | | | NON-REAL TIME GRAPHICS & CONCURRENT LIVE DIGITAL (TEXT) DATA STREAM | | 2 | | |
| | | | | LIVE DIGITAL (TEXT) DATA STREAM | | 3 | | |
| | C | 66% | CELLULAR DIGITAL MODEM | LIVE DIGITAL (TEXT) DATA STREAM | 1 | 1 | AVAILABLE | HOT BACKUP |
| | D | 66% | LAND LINE DIGITAL MODEM | LIVE DIGITAL (TEXT) DATA STREAM | 1 | 1 | | |

SUPPORTING EFFECTIVENESS OF APPLICATIONS IN A NETWORK ENVIRONMENT

FIELD

The present disclosure relates generally to communication networks and more particularly (but not exclusively) to methods and systems for supporting effectiveness of applications executing in network-centric operations and/or other network environments.

BACKGROUND

The statements in this section merely provide background information related to the present disclosure and may not constitute prior art.

As communication network environments become increasingly complex, chances for network failures also can tend to increase. Factors such as weather, equipment breakdown and mobility of network nodes are common causes of network capability degradation. In military network-centric operations (NCO), it is highly desirable for communications and/or weapon systems to perform effectively under difficult conditions, and particularly under battle conditions.

SUMMARY

In one implementation, the disclosure is directed to a network including a gateway node configured to control access to the network and a host device of a node of the network. One or more applications are configured to execute on the host device. A first module of the host device is configured to determine data transfer requirements for any given one of the one or more applications at a current capability level acceptable for the given application. A second module of the host device is configured to negotiate with the first module for allocation of resources of the host device to the given application. A module of the gateway node is configured to negotiate with the second module for allocation of network resources to the host device. The modules are further configured to perform the negotiating until, based on a probability of effectiveness of the given application at the current acceptable capability level, the given application is provided with network resources to satisfy data transfer requirements of the given application at the current acceptable capability level or at another acceptable capability level.

Further areas of applicability will become apparent from the description provided herein. It should be understood that the description and specific examples, while indicating various preferred embodiments of the disclosure, are intended for purposes of illustration only and are not intended to limit the scope of the present disclosure.

DRAWINGS

The drawings described herein are for illustrative purposes only and are not intended to limit the scope of the present disclosure in any way.

FIG. 4 is a process state matrix of initial state conditions between application and device modules configured in accordance with one implementation of the disclosure;

FIG. 6 is a process state matrix of final state conditions between application and device modules configured in accordance with one implementation of the disclosure; and FIG. 7 is a process state matrix of final state conditions between device and gateway modules configured in accordance with one implementation of the disclosure.

DETAILED DESCRIPTION

The following description is merely exemplary in nature and is in no way intended to limit the present disclosure, application, or uses.

Although various implementations of the present disclosure are described with reference to network-centric operations (NCO) and military applications, the disclosure is not so limited. The disclosure may be implemented relative to many different networks and network-centric environments, including but not limited to various enterprise systems and non-military applications.

Figure 1:
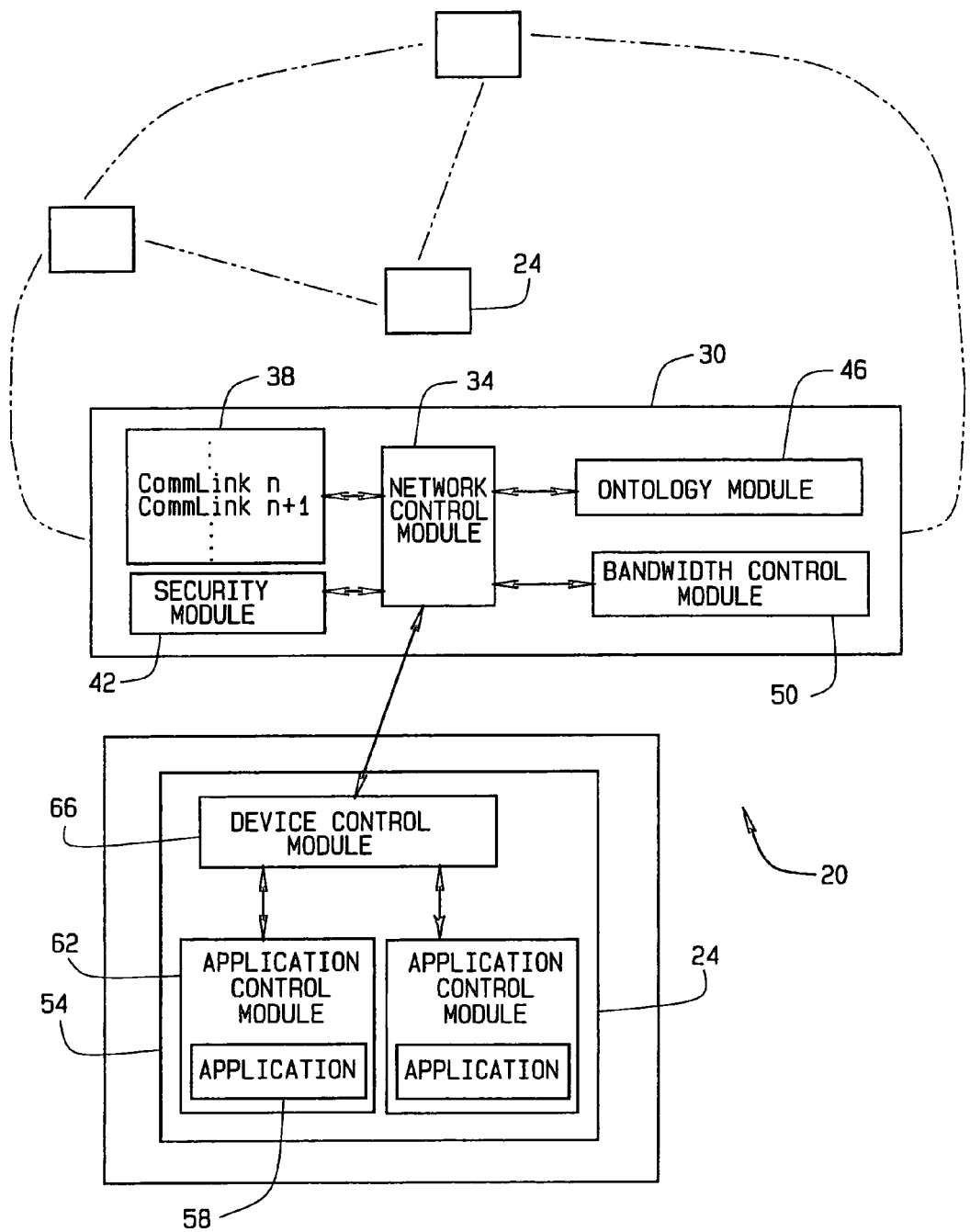
FIG. 1 is a schematic diagram of a network in accordance with one implementation of the disclosure.

A network in accordance with one implementation of the disclosure is indicated generally in FIG. 1 by reference number 20. The network 20 includes a plurality of nodes 24 each capable of communicating with at least one other node 24 of the network. One or more nodes 24 may be ad-hoc and/or mobile. The network 20 includes one or more gateway nodes 30 (also referred to as "gateways"), one of which is shown in FIG. 1. The gateway 30 is configured to control access by nodes 24 to the network 20. The gateway node 30 controls and/or assists other gateway and/or router nodes in controlling communication resources of the network 20 and in controlling data location and/or retrieval across the network 20. The gateway 30 is, e.g., a router that performs network management, data location and/or retrieval, language ontology, and security level control in accordance with various implementations of the present disclosure.

The gateway 30 includes a network control module 34 (also referred to as "gateway control module" or "gateway module") configured with other elements of the network 20 to perform various capability effectiveness assurance (CEA) functions as further described below. The network control module 34 can receive and/or update link state information for communication links 38. The gateway module 34 communicates with a security module 42, e.g., to provide multi-level security (MLS) for the network 20. The gateway module 34 communicates with an ontology module 46, e.g., to address harmonization of different languages interfacing the network 20. The ontology module 46 may also provide translation and/or other services for various applications running on the network 20. The network control module 34 also communicates with a bandwidth control module 50, e.g., to address resource optimization for the network 20.

Each node 24 includes one or more host devices 54, one of which is shown in FIG. 1. In some implementations, a host device 54 may be present in the network 20 as an ad-hoc node. Each host device 54 includes one or more applications 58 configured to execute on the device.

An application 58 may be capable of executing at more than one capability level. For example, at one capability level an application 58 may be capable of achieving a desired result by utilizing input data in the form of streaming video and concurrent live digital (i.e., text) data stream and by outputting data as a live digital (i.e., text) data stream. At a lower capability level, the same application 58 may use a simple live digital data stream for both input and output data to achieve the desired result.

Generally, a "capability level" for an application 58 may be defined as an ability of the application 58 to offer one or more specific capabilities by using one or more sources and/or types of data provided by one or more sources of communication and/or network resources. A capability effectiveness assurance (CEA) rating represents a probability that a desired capability can be provided by an application 58 based on particular levels of data quality and type provided. In other words, a CEA rating represents a probability of effectiveness of a desired capability, i.e., a probability that the capability can achieve a desired result.

Each application 58 is associated with an application control module 62. For example, a control module 62 may be a wrapper for an application 58. A control module 62 may determine transfer requirements for its application 58 at a current capability level acceptable for the application. A device control module 66 of the host device 54 is configured to negotiate with an application control module 62 for allocation of resources of the host device 54 to the application 58 associated with the module 62. For example, a device control module 66 may negotiate with an application control module 62 for delivery of data retrieved by the device 54 through its communication options to the network. A device 54 may provide varying levels of capability effectiveness assurance (CEA) probability.

The network control module 34 of the gateway node 30 may negotiate with the device control module 66 for allocation of network resources to the host device 54 and also may negotiate for what data can be provided. The modules 34, 66 and 62 may perform one or more passes of negotiation with respect to data transfer requirements of a given application 58 until, based on probability of effectiveness of the given application at the current acceptable capability level, the given application 58 is provided with network resources to satisfy requirements of the application at the current acceptable capability level or at another acceptable capability level. The application's probability of effectiveness (i.e., CEA rating) can be optimized by means of the foregoing negotiation process.

One exemplary implementation of the disclosure shall now be described with reference to FIG. 1. In the present example the network 20 is used for military, network-centric operations (NCOs). A targeting application 58 residing on a host device 54 requires as input, but unexpectedly loses, video targeting data just before a missile launch. However, the application 58 has been designed to allow for graceful degradation of operational capability level. Thus the application 58 can accept, instead of video targeting data, a text messaging stream to acquire targeting coordinates. The application module 62 for the targeting application 58 requests the alternative data stream from the device module 66. The device module 66 analyzes its communication options and, via its active communication links, contacts the network environment, e.g., the gateway control module 34, to determine whether the alternative data stream is available. If the network environment can provide the data, it acquires the requested data stream and passes it to the device module 66. The device module 66 confirms to the application module 62 that it can provide the text stream. The device module 66 provides the backup data stream to the targeting application 58 and the mission continues. Once the application 58 has received the backup data, the device module 66 contacts the gateway module 34 to inform it that the video link that was to have provided a video data stream to the application 58 is no longer needed. The gateway module 34 then can reallocate the released bandwidth to other devices, to improve overall environment capability and CEA rating(s) of application(s) at other attached node(s) 24.

In some implementations, an application module 62 may be configured to provide some mode of capability even if total access to the network 20 is lost. Additionally or alternatively, a device module 66 may be configured to establish access to another environment on the fly, such as by a cell phone modem, if the main network environment is lost.

Figure 2:
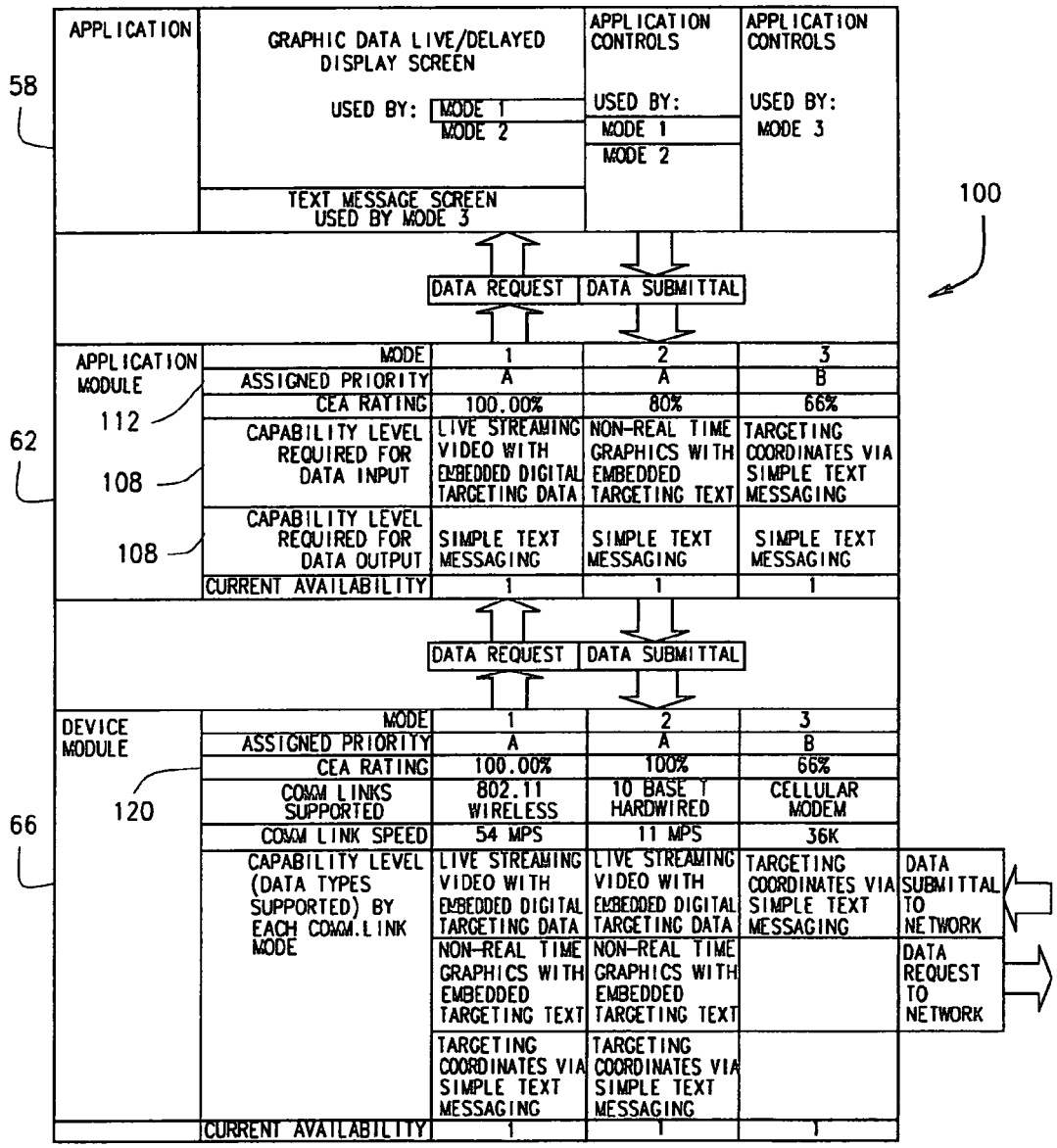
FIG. 2 is a schematic diagram of an application, application control module and device control module in accordance with one implementation of the disclosure.

A diagram of an application 58, application control module 62 and device control module 66 is indicated generally in FIG. 2 by reference number 100. For each specific combination of an application 58 and operating system on the host device 54, the associated application control module 62 describes or can refer to specific levels 108 of capability supported in the network 20 and capability level degradation priorities 112 for the application 58. The module 62 also describes or can refer to data modes required to support application capabilities as well as data formats, data quality and data rates required to sustain each defined capability level. Application capability levels 108 are supported based on available data and node capability.

It should be noted generally that various parameters used by the modules 62, 66 and 34 to perform resource arbitration, including but not limited to CEA ratings 120 and resource access priorities, may be dynamically defined and applied to the network 20. Such parameters can be passed along to lower-level gatekeeper modules to aid in their own management decisions, and may be re-adjusted on the fly by a user and/or by the network 20. Such capabilities are described in co-pending U.S. patent application Ser. No. 10/000,563, entitled "Method for Improving Bandwidth Performance of a Mobile Computer Network" and which is incorporated herein by reference.

The device control module 66 describes and/or refers to input/output (I/O) modes and technologies supported for the host device 54 hardware set, with switchover rules based on capability level degradation priorities and data flow availability. The device module 66 feeds back possible data flows and maintains status of available communication links to both modules 62 and 34. Such status changes may have been triggered by the device module 66 and/or by the modules 34 and/or 62. Levels of capability are supported for various applications based on available data flow and node capability.

Figure 3:
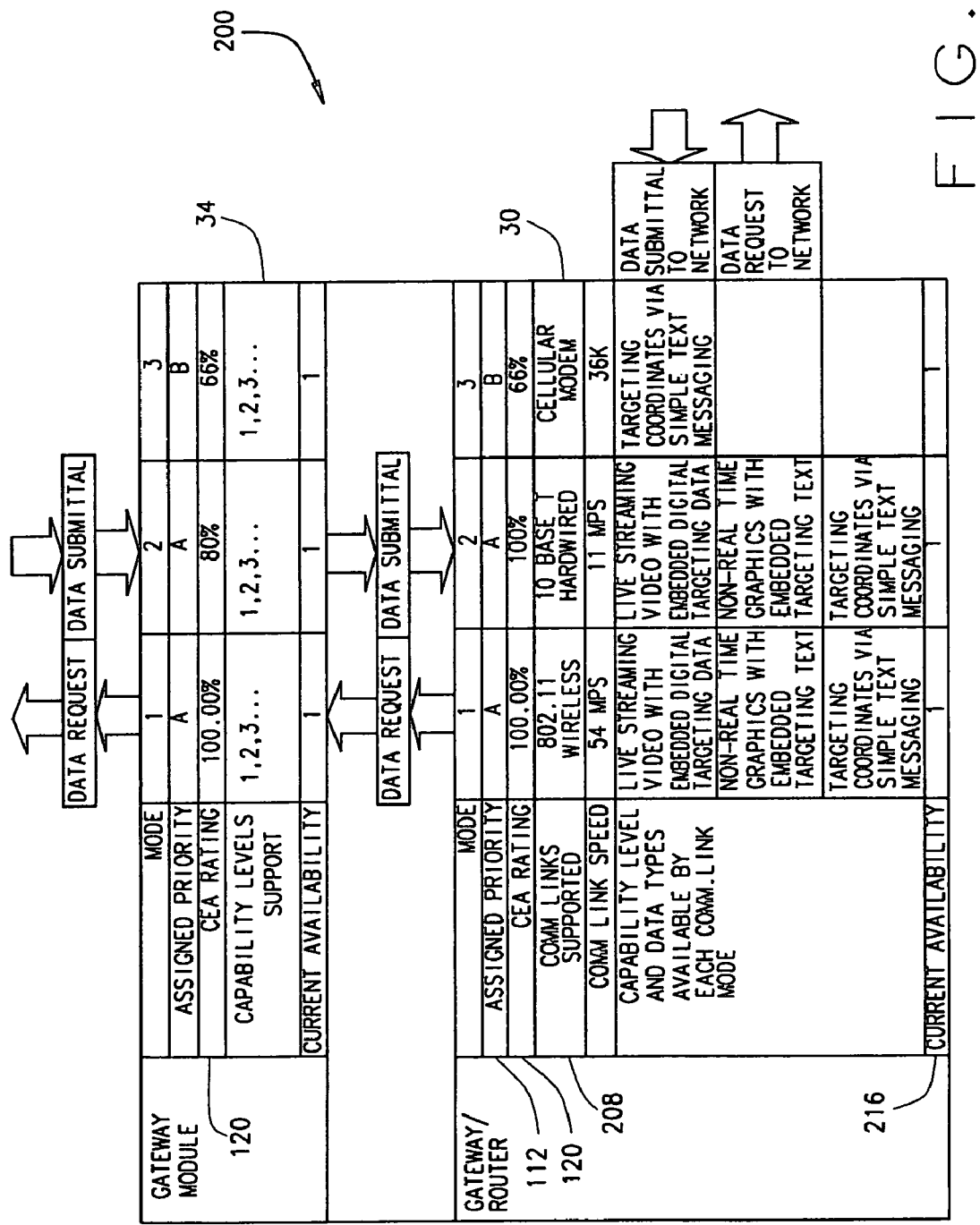
FIG. 3 is a schematic diagram of a gateway/router and gateway module in accordance with one implementation of the disclosure.

A diagram of a gateway/router 30 buffered by a gateway module 34 is indicated generally in FIG. 3 by reference number 200. The gateway control module 34 utilizes parameters for both nodes 24 and/or the network 20. Such parameters may include: supported communication links hosted 208, availability 216, and their capabilities threshold; supported ontologies and security levels; communications layer interoperability (CLI) and minimum levels of interoperation (MLI) requirements for the network 20; and bandwidth management methodologies and/or bandwidth priorities used in the network 20. The gateway control module 34 of a gateway 30 is an ultimate determiner of specific application capability levels 108 that can be made available to ad-hoc nodes 24 at any time. The gateway control module 34 may update all connected CEA managers of the network 20 in real time. The gateway control module 34 also provides self-healing capabilities to damaged grid and nodes.

An application 58 may interface with an application control module 62 in following exemplary manner. An application 58 may call CEA-enhanced socket functions for CEA provisioning. Based on capability level information provided by the application 58, the application control module 62 maps a connection to the appropriate CEA provisioning mechanism. Management of application capability level switching can be performed across a plurality of network interfaces on a host device 54. Application control modules 62 provide notification to applications 58 local to the host device 54 when network resource conditions change. These changes can be relayed to remote applications 58. Thus, local and remote resource management can be performed via distributed bandwidth broker entities.

Accordingly, an application control module 62 includes a filter driver that emulates dynamic link state characteristics which are based on a profile maintained in the system.

The application module 62, on receiving a link state update notification, determines and appropriately updates transport control configurations for existing data flows. This allows for notification support to applications 58 with ongoing data flows of changes to their CEA provisioning state. The result of the updating determines whether new data flow CEA provisioning can be supported in addition to the existing data flows.

One implementation of network management can be followed in process state matrices shown in FIGS. 4-7. FIG. 4 illustrates initial state conditions, numbered as 300, between an application module 62 and a device module 66. An application 58 is running in a normal mode due to the availability of optimal data via optimal communication links available as well as optimal data available from the network 20. The state conditions 300 show that the optimal data flow for the application 58, in this case a streaming video and concurrent live digital (text) data stream, can be provided to the application by current device communication link resources for the host device 54.

Figure 5:
FIG. 5 is a process state matrix of initial state conditions between device and gateway modules configured in accordance with one implementation of the disclosure.

FIG. 5 illustrates initial state conditions, numbered as 400, between the device module 66 and gateway module 34. It can be seen in FIG. 5 that the host device has acquired the required data stream required by the application 58 via current network gateway resources. After live video data feed is lost from the network gateway 30, the modules 62, 66 and 34 negotiate with one another in the following manner. The application module 62 detects the loss of the live video feed and contacts the device module 66 to locate an acceptable data stream that will allow the application to maintain a CEA rating which will allow the application 58 to be effectively executed.

The device module 66 determines that its two available communication links, wireless Ethernet and a wireless digital mode, can allow access to the three acceptable data streams acceptable for the application 58. The device module 66 queries the gateway module 34 to determine first if both communication links are available. The gateway module 34 confirms that the links are still live. The device module 66 then requests availability of the three data streams that meet the application CEA requirements.

The gateway module verifies that the requestor has the necessary priority code to access all three data streams. The gateway module 34 then determines actual availability of the three requested data streams and determines that both the live and semi-live graphics data have been lost. The gateway module 34 informs the device module 66 that the only data stream available is simple digital text data, similar to simple e-mail and/or text messaging. The device module 66 confirms that the third choice data stream is acceptable to the application 58. The third choice provides a marginally acceptable CEA rating 120 such that it needs to be confirmed by a user of the application 58. The user accepts the degraded performance and the application module 62 confirms the acceptance to the device module 66.

Now that the data stream has been identified, the device module 66 negotiates with the gateway module 34 to get the digital data stream by the fastest communication link possible. The gateway module 34 determines that the requestor has priority to access wireless Internet and wireless digital modem. The gateway module 34 also confirms that sufficient network resources are available to allow access to either communication mode. Based on the higher CEA rating 120 for the wireless Ethernet, the gateway module 34 notifies the device module 66 that the data will be provided by the faster wireless Ethernet mode. The device module 66 routes the new data stream to the application module 62. The new data stream allows the application 58 to be executed despite loss of the primary and secondary data streams.

Figure 7:
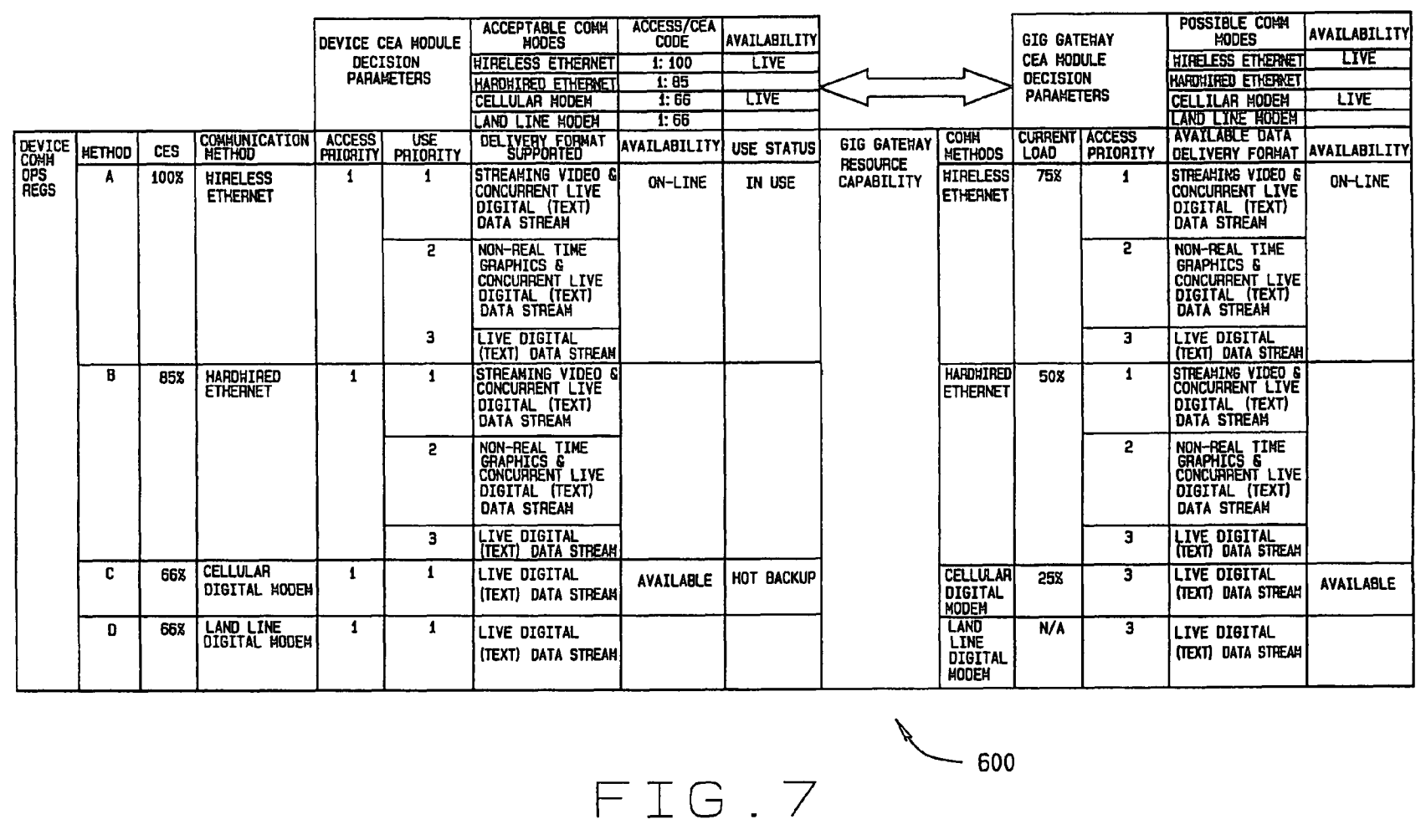

FIG. 6 shows the final state conditions, numbered as 500, negotiated between the application and device modules. FIG. 7 shows the final state conditions, numbered as 600, negotiated between the device and gateway modules that results in both self-healing for the lost data stream as well as self-optimization of the possible replacement communication links and data formats that can allow the application 58 to complete its mission.

Implementations in accordance with the present disclosure can be used to improve a probability that an assigned mission, which is to be accomplished by use of specific NCO applications, succeeds despite known or unknown factors which may threaten mission effectiveness. Various implementations provide a multi-layer integrated arbitration and optimization methodology across various network capabilities. Multi-level resource request arbitration and management, self-healing, and self-optimizing are provided for network-centric devices, systems and environments.

The modules 34, 66 and/or 62 can arbitrate, essentially concurrently, a network sub-capability's requirements to resolve conflict and optimize effectiveness in areas such as processing, storage, and communication links. Such arbitration entails balancing the needs of various network capabilities to maximize overall probability of effectiveness of the intended network capability. Standards and methodologies can be defined and applied across the network environment on components, devices, and applications. Thus self-healing and optimization can occur at low levels of the network, with a minimum of user input, while probability of optimization across the network environment can be maximized.

Support and interaction can be provided from application to host device and to end-to-end resource, thereby enhancing performance management of the network environment. Probability of success of running real-time applications over networks is enhanced. Bandwidth allocation can be optimized among multiple applications. Various implementations can provide an ability to better provide a required level of performance to an end-user and/or application irrespective of network traffic.

Arbitration for resources is performed across network levels, making it possible to evaluate available end-to-end resources and perform defined policy management to control end-system and network access and usage policy. Various implementations can be used to prevent over-provisioning of a network with resources to assure satisfaction of application requirements and a high probability of application success. Network routing and resource reservation mechanisms can be optimized and overall environment capabilities can be enhanced.

The foregoing management control modules allow an application to "gracefully" degrade to secondary capability levels that can be met by lower system capabilities. Systems lose capability in a controlled manner and do not simply "drop out" in mid-operation without warning or recourse. Such automatic adjustments can reduce reaction times, often without user inputs, to prevent loss of critical data flow.

Because a network can be configured to self-heal, applications can continue at a credible level of effectiveness despite losses of primary sources and/or modes of key data flow. Bandwidth management is provided for on the fly, thus facilitating re-prioritization of resources under battlefield conditions. Rules of engagement can be embedded into a network environment at three levels of gate-keeping which can share in system management and provide redundant control. Security can be maintained despite major changes in communication links and/or methodology available.

Various implementations of the foregoing resource management architecture make it possible to integrate capability management via common methodologies and interfaces to manage a plurality of aspects which determine actual NCO capability effectiveness. Various capabilities such as CEA methodologies, network management and optimization, multi-level autonomous and automatic self-healing and on-the-fly optimization can be incorporated into the foregoing architecture. On-the-fly intelligent analysis of flow control and resource reservation can be provided for all NCO capabilities, including optimal path determination with multiple constraints. Dynamic large-scale heterogeneous network systems can be managed at a local level to dynamically adjust varying network topology and link bandwidth impact due, e.g., to mobile ad hoc wireless networks. The foregoing architecture allows for dramatically improved probability of mission success due to the ability to allow for continued mission execution via controlled capability realignment that still allows for a minimal level of capability of the impacted system and devices, despite degradation caused by mission factors.

Design methodology and control methodologies may be coordinated to allow for significant design reuse. For example, the foregoing control modules could be implemented in a standard form for use in a large network environment. Furthermore, previously existing NCO systems can remain in-use and co-exist with configurations of the foregoing architecture.

While various preferred embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A communication network comprising:
    a host device on which a plurality of different data input/output modes are supported;
    an application capable of executing on the host device at a plurality of capability levels requiring use of at least some of the different data input/output modes;
    an application control module of the host device configured to determine data transfer requirements for the application at a current capability level acceptable for the application;
    a device control module of the host device configured to negotiate with the application control module for allocation of one or more data streams by the host device to the application, the negotiating including negotiation as to types of data input/output modes for the one or more data streams;
    at least one gateway node configured to support the application capability levels by controlling location of and access to a plurality of data sources provided in the network for satisfying data transfer requirements for the application capability levels; and
    a module of the at least one gateway node configured to negotiate with the device control module for location by the at least one gateway node of one or more of the data sources in the network and for allocation of one or more data streams of the one or more located data sources to the host device for the application, the negotiating including negotiation as to types of data input/output modes for the one or more data streams;
    all of the modules configured to collectively perform the negotiating until, based on one or more probabilities of effectiveness of the application at one or more of the capability levels, the application is provided with one or more data streams of the data sources to satisfy data transfer requirements of the application at the current capability level or at another acceptable capability level for which one of the one or more data sources located in the network by the at least one gateway node provides a data stream alternative to a data stream associated with the current capability level, the host device being provided access to the alternative data stream using a data input/output mode different from a data input/output mode associated with the current capability level.

2. The network of claim 1, wherein the probability of effectiveness is dynamically assigned to the application via the network.

3. The network of claim 1, wherein the data transfer requirements comprise transfer rate, data format and data quality requirements.

4. The network of claim 1, wherein the gateway node module is configured to negotiate based on bandwidth priorities of the network.

5. The network of claim 1, wherein the other acceptable capability level is determined for the application based on capability level degradation priority.

6. The network of claim 1, wherein a node that includes the host device is an ad-hoc node.

7. The network of claim 1, wherein the negotiating is collectively performed by all of the modules using resource arbitration parameters dynamically applied to the network.

8. The network of claim 1, wherein the gateway node includes a router.

9. The network of claim 1, wherein at least one of the one or more host devices is comprised by an ad-hoc node.

10. The network of claim 1, wherein the alternative data stream provides backup data for the application.

11. The network of claim 1, wherein the different data input/output modes comprise two or more of the following: streaming video, streaming video with concurrent live digital text stream, non-real-time graphics with concurrent live digital text stream, non-real-time graphics, and live digital text stream.

12. A processor-performed method of managing resources in a communication network, comprising:
    for an application configured to execute at a plurality of capability levels on a host device of the network, an application control module of the host device determining data transfer requirements for the application at a first capability level currently acceptable for the application, the first capability level associated with a first of a plurality of different data input/output modes supported on the host device;
    controlling location of and access to a plurality of data sources for possible use by the application to meet data transfer requirements at one or more of the capability levels, the controlling performed by at least one network gateway router configured to support the plurality of capability levels;

a plurality of devices of the network arbitrating allocation of one or more data streams of the data sources through the at least one network gateway router to the host device based on network bandwidth priority and one or more probabilities of effectiveness of the application, the arbitrating including arbitrating as to types of data input/output modes for the one or more data streams;

the application control module and a device control module of the host device arbitrating allocation of the one or more data streams to the application at one or more of the capability levels based on one or more probabilities of effectiveness of the application, the arbitrating including arbitrating as to types of data input/output modes for the one or more data streams; and as a result of the arbitrating, the device control module allocating one of the data streams to the application, the allocated data stream being provided at a second capability level acceptable for the application and provided using a second data input/output mode of the host device different from the first data input/output mode.

13. The method of claim 12, wherein arbitrating allocation of data streams is further based on degradation priorities of the application.

14. The method of claim 12, wherein the application data transfer requirements include transfer rate, data format, and data quality requirements.

15. The method of claim 12, further comprising, based on the arbitrating, the application control module determining data transfer requirements for the application based on another capability level for the application.

16. The method of claim 12, wherein the allocated data stream is provided to the application to replace data provided using the first data input/output mode.

17. A system for resource management in a network, the system comprising:

one or more host devices of the network;

a plurality of applications configured to execute on the one or more host devices at a plurality of capability levels associated with a plurality of different data input/output modes supported on the one or more host devices;

one or more gateway nodes of the network configured to support the application capability levels by controlling location of and access to a plurality of data sources provided in the network for satisfying data transfer requirements of the applications;

for each of the applications, a corresponding application control module of the host device of the application, the application control module configured to determine data transfer requirements of the corresponding application for a current capability level of the application;

on each host device, a corresponding device control module configured to:
 arbitrate allocation of resources of the host device to the one or more applications executing on the host device based on the one or more current capability levels and one or more probabilities of effectiveness and degradation priorities of the one or more applications, the arbitrating including arbitrating as to types of data input/output modes of the resources, and
 negotiate allocation of at least one data stream of the data sources by one of the one or more gateway nodes to the host device, the negotiating including negotiating as to types of data input/output modes for the at least one data stream; and on each gateway node, a network control module configured to arbitrate allocation of at least one data stream of the data sources to one of the one or more host devices based on priorities of probability of effectiveness and bandwidth management;

the gateway nodes and host devices configured to provide a first data stream to a given application at a first capability level of the given application and to provide a second data stream at a second capability level of the given application to compensate for a loss of the first data stream, the first and second data streams provided using different data input/output modes of the host device of the application.

18. The system of claim 17, wherein at least one of the one or more applications is configured to accept a capability level different from its current capability level.

* * * * *